United States Patent
Madni et al.

(10) Patent No.: US 6,448,759 B2
(45) Date of Patent: Sep. 10, 2002

(54) NON-CONTACT LINEAR POSITION SENSOR FOR MOTION CONTROL APPLICATIONS WITH INDUCTIVE ATTENUATING COUPLER

(75) Inventors: Asad M. Madni, Los Angeles; Jim B. Vuong, Northridge, both of CA (US)

(73) Assignee: BEI Sensors and Systems Company, Inc., Sylmar, CA (US)

(*) Notice: Subject to any disclaimer, the term of this patent is extended or adjusted under 35 U.S.C. 154(b) by 0 days.

(21) Appl. No.: 09/764,840

(22) Filed: Jan. 17, 2001

Related U.S. Application Data

(63) Continuation-in-part of application No. 09/390,885, filed on Sep. 7, 1999, now Pat. No. 6,304,076.

(51) Int. Cl.⁷ .................................................. G01B 7/14
(52) U.S. Cl. .................................. 324/207.17; 318/661
(58) Field of Search ....................... 324/207.17, 207.18, 324/207.12, 207.25; 318/661, 660, 654, 657

(56) References Cited

U.S. PATENT DOCUMENTS 4,893,078 A * 1/1990 Auchterlonie .......... 324/207.17
5,339,029 A * 8/1994 Wagner ................. 324/207.17

* cited by examiner

Primary Examiner—Edward Lefkowitz
Assistant Examiner—Subhash Zaveri
(74) Attorney, Agent, or Firm—Coudert Brothers LLP

(57) ABSTRACT

A non-contact linear position center has juxtaposed transmit and receive sections with a coupler or slider section interposed therebetween carrying a symmetrical attenuating conductive pattern. The inductive coupling of coils on the transmitter and receive sections is attenuated in accordance with the linear position of the pattern on the coupler. A unique sinusoidal signal is generated whose phase is indicative of the linear position of the coupler.

6 Claims, 6 Drawing Sheets

Transmitter Section

Slider Section

Receiver Section

NON-CONTACT LINEAR POSITION SENSOR FOR MOTION CONTROL APPLICATIONS WITH INDUCTIVE ATTENUATING COUPLER

RELATED APPLICATIONS

This is a continuation-in-part of U.S. patent application Ser. No. 09/390,885, filed Sep. 7, 1999, entitled ANGULAR POSITION SENSOR WITH INDUCTIVE ATTENUATING COUPLER and now U.S. Pat. No. 6,304,076.

INTRODUCTION

The present invention is directed to a non-contact linear position sensor for motion control applications.

BACKGROUND

In order to meet the current stringent reliability and meantime before failure (MTBF) requirements demanded by the automotive, industrial and aerospace industries, position sensors must be based on a non-contact design approach. For automotive use, the design must be suited for low cost, high volume, and high reliability. The above parent application discloses and claims an angular position sensor which is useful, for example, in the automotive field for determining the rotation of a steering column. This same type of non-contacting position sensor can also be adapted to measure the torque in a steering column as disclosed in a co-pending application, Ser. No. 09/527,088 (now U.S. Pat. No. 6,304,076), filed Mar. 16, 2000, entitled, NON-CONTACTING TORQUE SENSOR and assigned to the present Assignee. However, there is still a need for a linear position sensor, for example, one that may be used with a voice-coil actuator in order to provide built-in feedback control for motion control applications.

OBJECT AND SUMMARY OF INVENTION

It is therefore a general object of the present invention to provide a non-contact linear position sensor for motion control applications.

In accordance with the above object there is provided a position sensor for sensing rectilinear movement of an object along an axis comprising a pair of spaced substantially rectilinear radio transmit and receive sections juxtaposed on the axis facing each other with a coupler section between them, the coupler being movable along the axis and connected to the object. The receive section carries a predetermined number of independent inductive coils segmentally arranged in a rectilinear pattern along the receive section. The transmit section carries coil means in a rectilinear pattern similar to the receive section and is driven by a signal source at a predetermined radio frequency for inductive coupling to the coils of the receive section. The coupler section carries at least one symmetrical conductive pattern for attenuating the inductive coupling, the pattern having linear positions of maximum and minimum attenuation with respect to any one of a plurality of inductive coils carried by the receive section, intermediate positions of the pattern between the maximum and minimum providing substantially proportionate attenuations. Means connected to the coils carried by the receive section demodulate and sum induced transmitted signals from the signal source for each linear position of the coupler, the summation producing a substantially sinusoidal waveform whose phase shift varies in proportion to the linear movement coupler section. Means are provided for sensing the phase shift.

DESCRIPTION OF PREFERRED EMBODIMENTS

Figure 2:
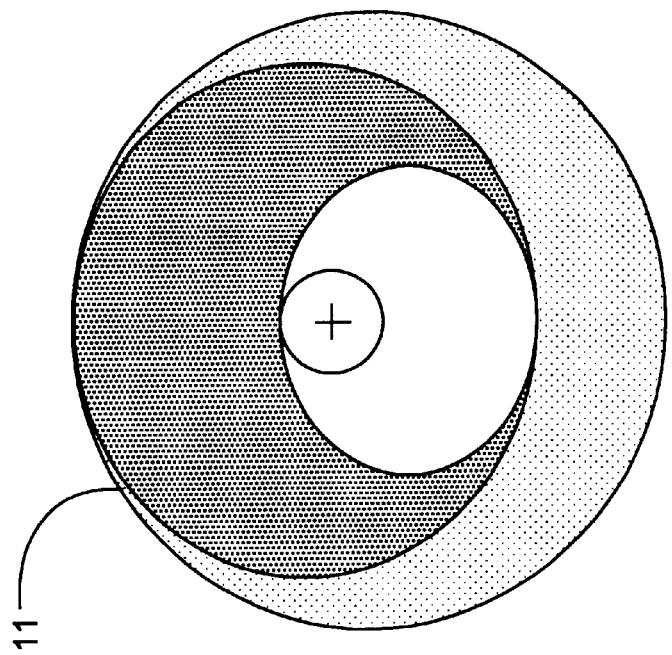
FIG. 2 is a plan view of a coupler disk as used in the angular position sensor of the above parent application in conjunction with the transmit and receive portions of FIG. 1.
Figure 1:
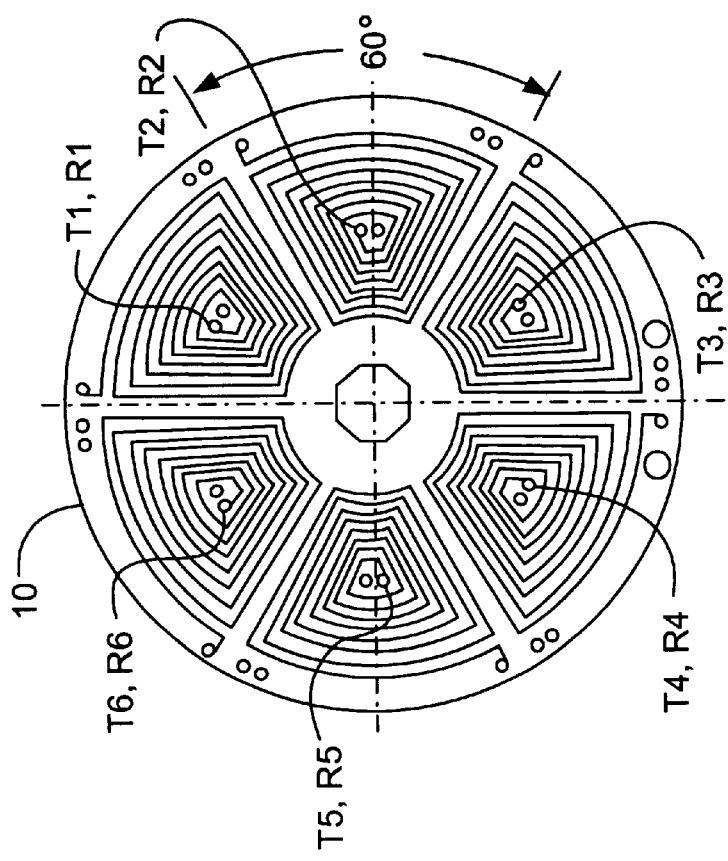
FIG. 1 is a plan view of both the transmit and receive portions of an angular position sensor as disclosed in the above parent application.

Referring now to FIGS. 1 and 2 these illustrate the angular position sensor of the parent application where the disk 10 illustrates both the transmit and receive sections or disks which contains six identical loop antenna coils designated for the transmit portion T1–T6 and for the receive section R1–R2. A coupler disk 11 as illustrated in FIG. 2 is sandwiched between the transmit and receive disks and rotation of the crescent-shaped conductive portion of the coupler disk causes a phase shift in the signals from the receive coils which is proportional to rotary or angular displacement. As illustrated in FIG. 1, the coils are spaced 60° apart.

Figure 3A:
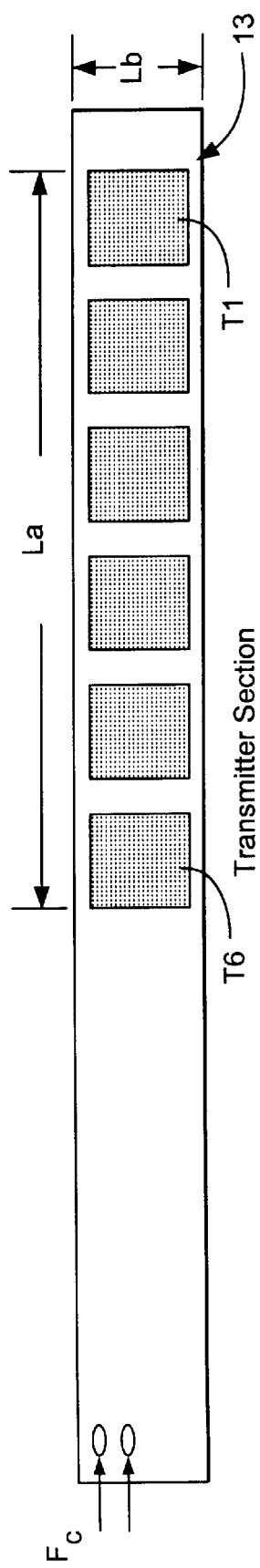
FIG. 3A is a simplified plan view of a transmitter section of the present invention.
Figure 3B:
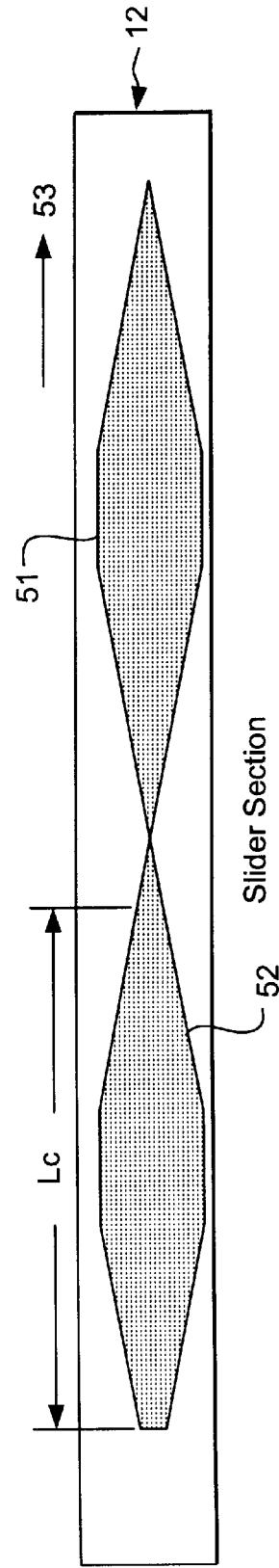
FIG. 3B is a simplified plan view of a slider or coupler section of the present invention.
Figure 3C:
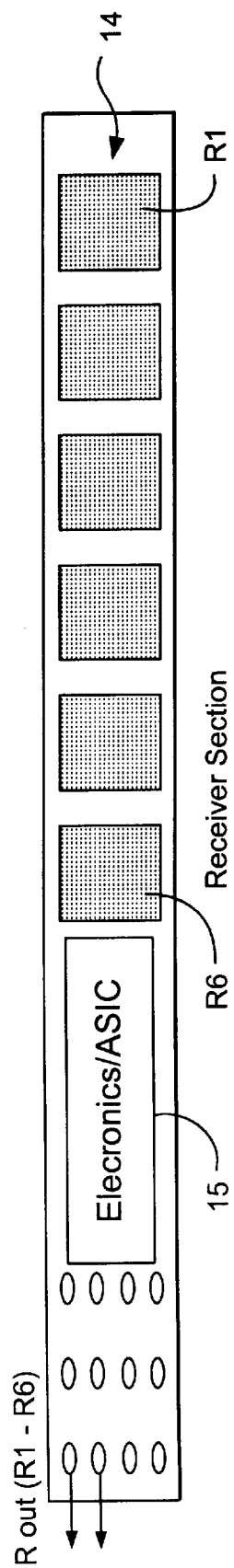
FIG. 3C is a simplified plan view of receiver section of the present invention.

The present invention utilizes the above principle to measure linear displacement. Thus, FIG. 3A is a transmitter section 13 having six inductive coils T1–T6 arranged in a rectilinear pattern with a total distance $L_a$ with a width of $L_b$. A similar rectilinear receive section 14, FIG. 3C, has similar receive coils R1–R6 and includes a specialized electronics integrated circuit unit 15 to provide output voltages designated $R_{out}$ for each receive coil. Then juxtaposed between the transmitter and receiver sections 13 and 14, is a slider on coupler section 12 having substantially symmetrical diamond shaped coupler patterns 51 and 52 (see FIG. 3B) which are conductive with a nominal length of each pattern being designated $L_c$. Thus, movement of the coupler section in the direction 53 attenuates the inductive coupling between transmitter and receiver sections 13 and 14 to produce an output signal (to be discussed below) whose phase shift varies with the amount of attenuation, which is proportionate to linear displacement.

Figure 9B:
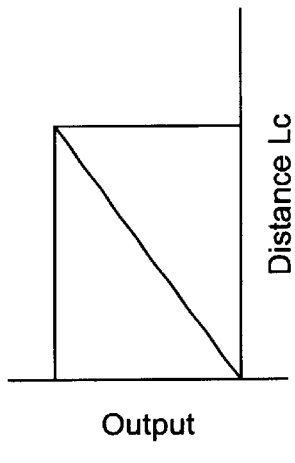
FIG. 9B is the characteristic curve of the electrical output provided by FIG. 9A.
Figure 9D:
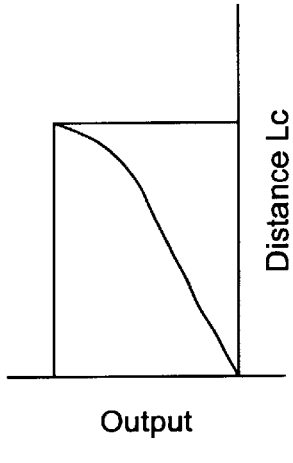
FIG. 9D is a characteristic output of the alternate embodiment shown in FIG. 9C.
Figure 9F:
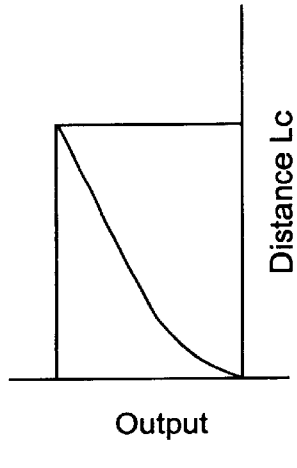
FIG. 9F is a characteristic output of the alternate embodiment shown in FIG. 9E.
Figure 9A:
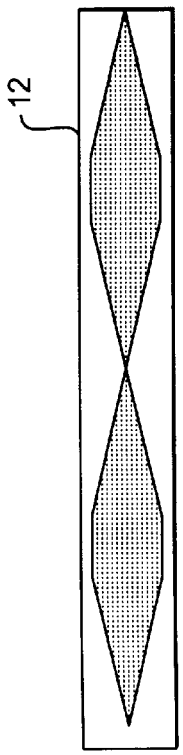
FIG. 9A is another illustration of FIG. 3B.
Figure 9C:
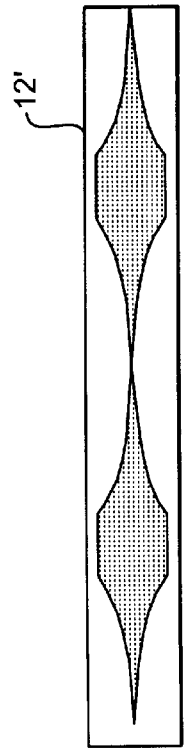
FIG. 9C is an alternate embodiment of FIG. 9A.
Figure 9E:
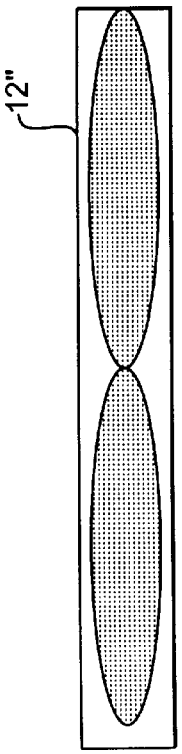
FIG. 9E is an alternate embodiment of FIG. 9A.

FIG. 9A shows the coupler section 12 and the electrical signal output related to the distance $L_c$ is illustrated as a straight line in FIG. 9B. To generate an effective signal, generally the total length of the slider section 12 is as illustrated equal to $L_c$ plus $L_a$. Thus the patterns 51 and 52 for a longer displacement must be repeated several times and from a practical standpoint, there must be one additional diamond-shaped section 51, 52, etc. more than is necessary for the total distance to be measured. And also, in general, $L_c$ is equal or less than $L_a$. Thus, for a long multi-sectioned symmetrical pattern on slider section 12, a cycle counter is required to identify the effective revolutions or repetitions. This insures that the transmitter and receiver are exposed to the total length of the pattern on the slider section 12 at all times.

Figure 4:
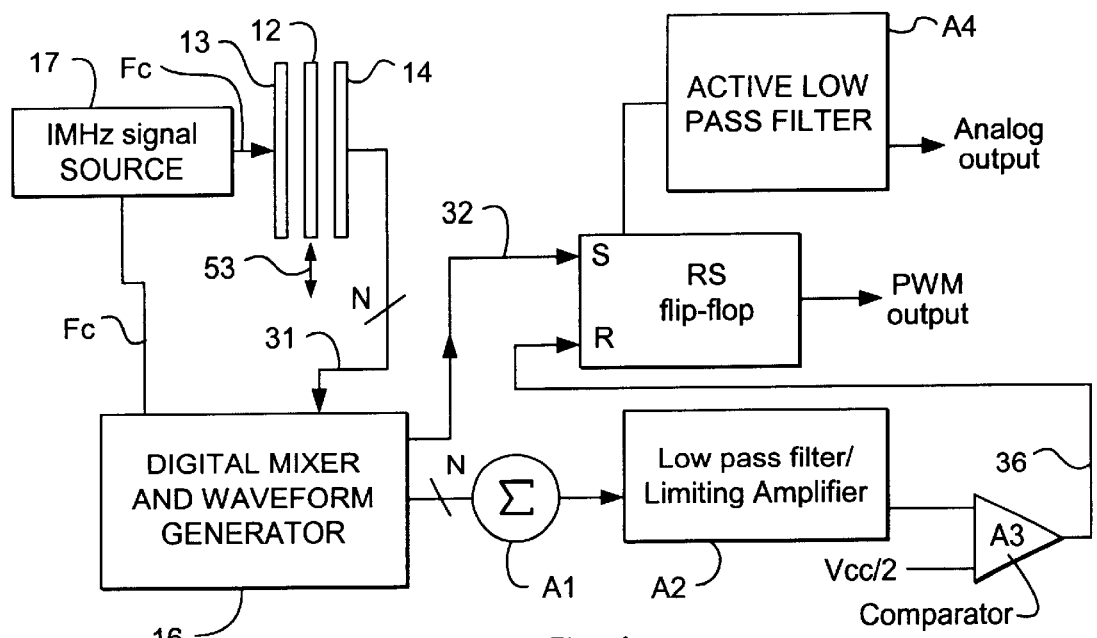
FIG. 4 is a simplified circuit schematic illustrating the present invention.

FIG. 4 illustrates the transmitter and receiver sections 13 and 14 with the slider or coupler section 12 interposed, which will move in a linear manner as indicated by the arow 53, in association with the electrical signal processing circuit. A signal source 17 supplies a signal, $F_c$ to the coils of the transmit section 13 which are inductively coupled to receive section 14 and attenuated by the slider section 12. Signal 17 is also connected to a digital mixer and waveform generator 16 which also has as an input 31, the six receive coils, on output line 32, a set (S) signal is supped to an RS flipflop.

Since the coupler or slider section will interrupt and attenuate the signal amplitudes based on the coupler pattern with respect to the position of each receiver coil, six different amplitude signals are simultaneously generated by an amplifier A1 and then input through a lowpass filter and limiting amplifier A2. The output signal of amplifier A2 is illustrated in FIGS. 6A, 6B, 6C and 6D which represents four different linear positions of the coupler or slider. Their phase shift is proportional to the linear position of the coupler or slider.

Referring back to FIG. 4 comparator to A3 then converts these waveforms to a square wave at output 36 which drives the R input of the RS flipflop. This produces a pulse width modulator (PWM) output where the width of the pulse is exactly proportional to the amount of movement of the slider. Filter A4 provides an alternative analog output.

Figure 5:
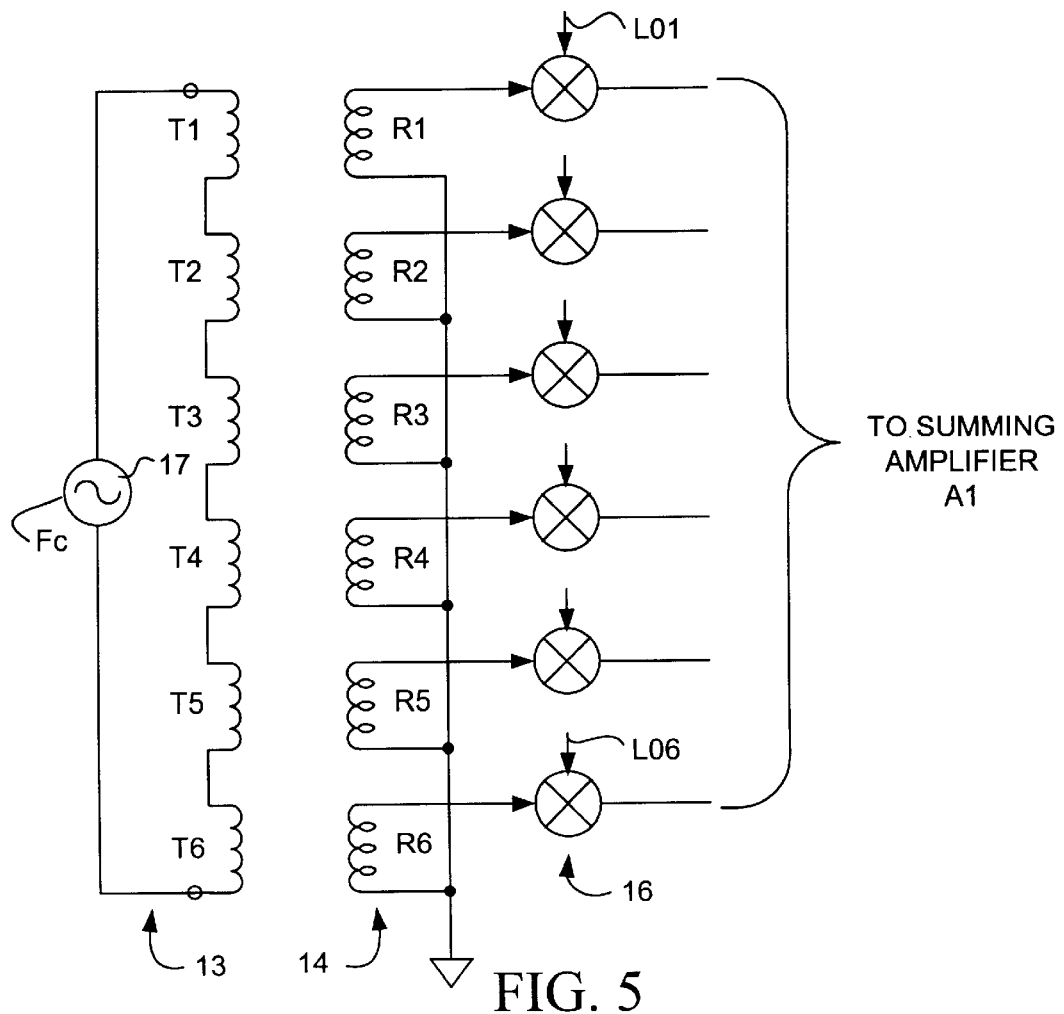
FIG. 5 is a detailed schematic of a portion of FIG. 4.
Figure 6A:
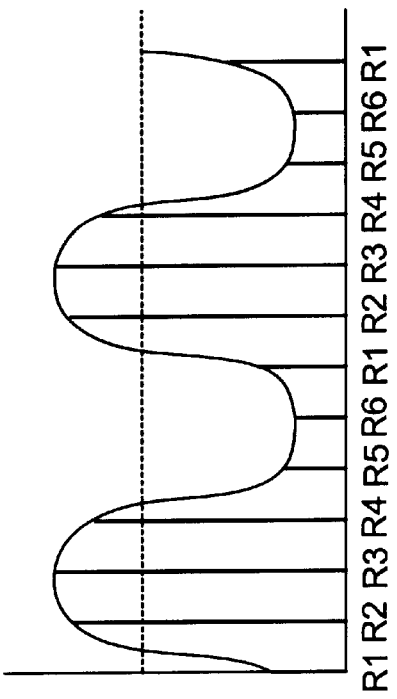
FIGS. 6A, 6B, 6C and 6D are wave forms illustrating the operation of the invention.
Figure 6B:
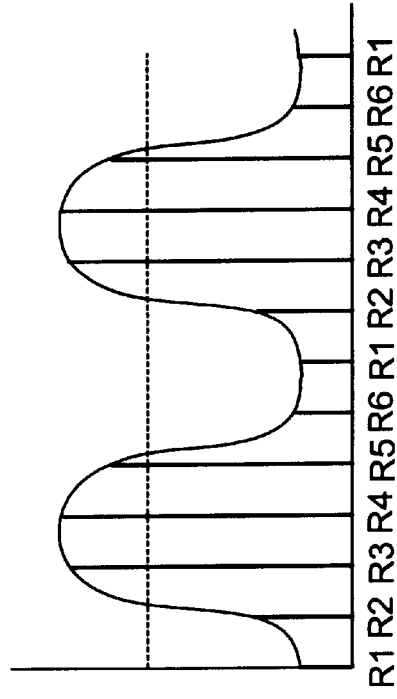
Figure 6C:
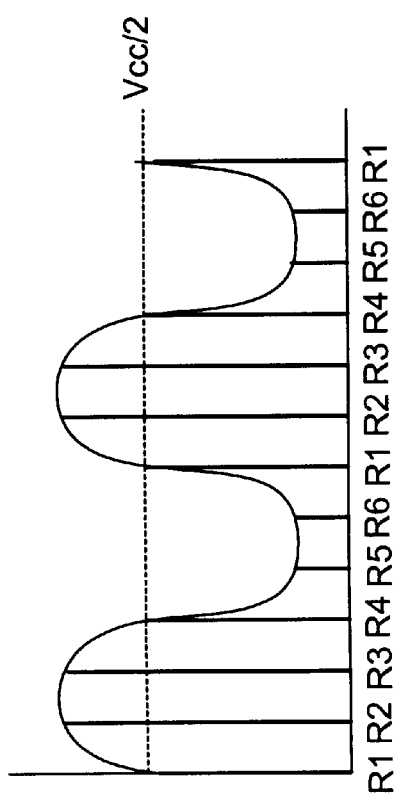
Figure 6D:
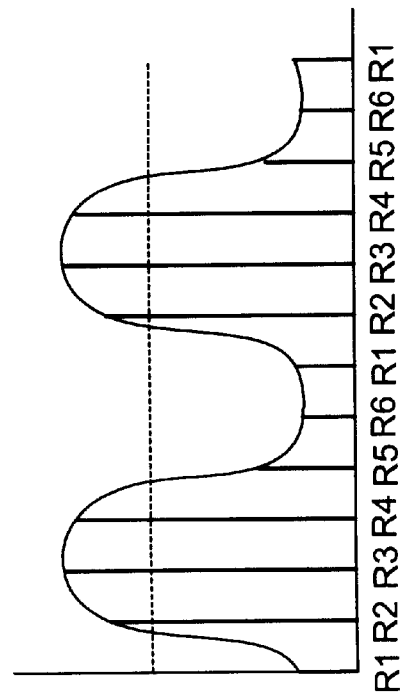

FIG. 5 illustrates the digital mixer and waveform generator 16 and how it is related to the transmitter and receive coils 13 and 14, including being driven by six local oscillator signals L01–L06 which are shifted in phase from one another by 60°, i.e., by the number of receive coils cited in 360°. The foregoing is more totally explained in conjunction with the parent application.

Figure 7:
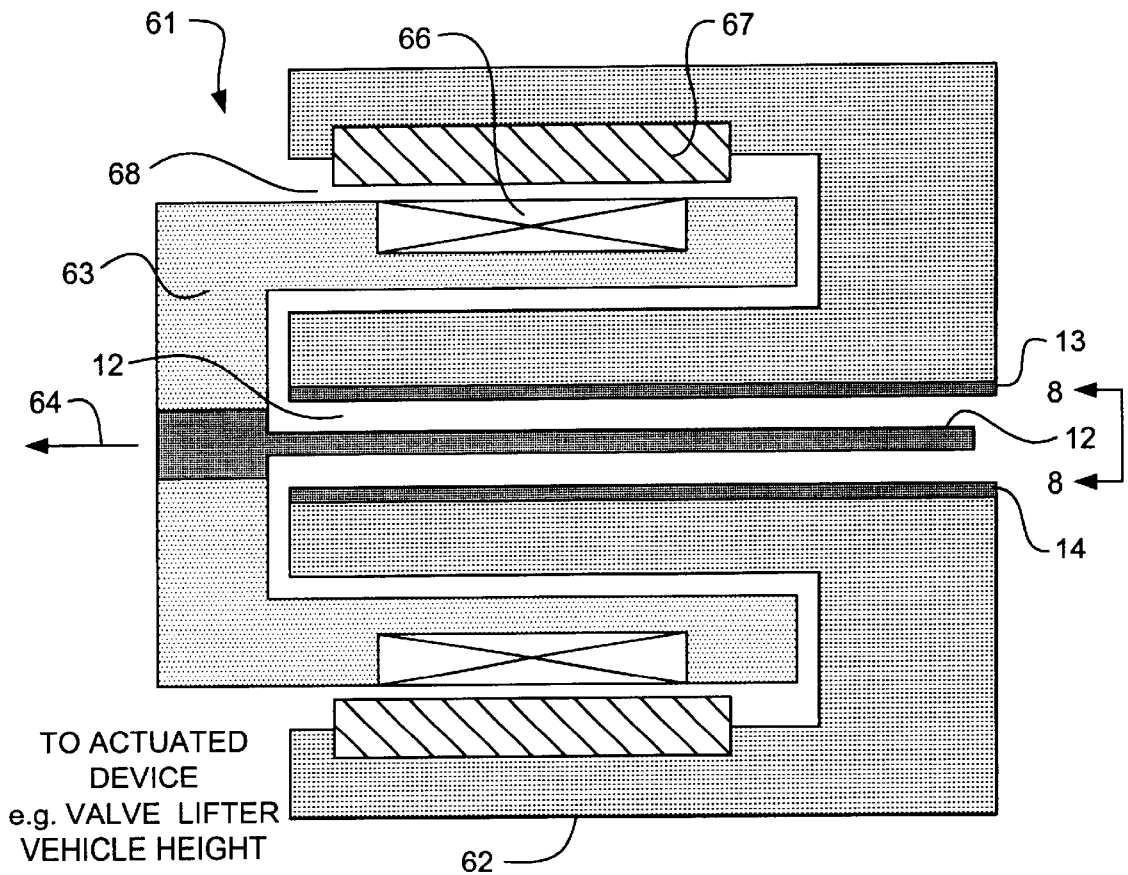
FIG. 7 is a cross-sectional view of a voice coil actuator incorporating the position sensor of the present invention.
Figure 8:
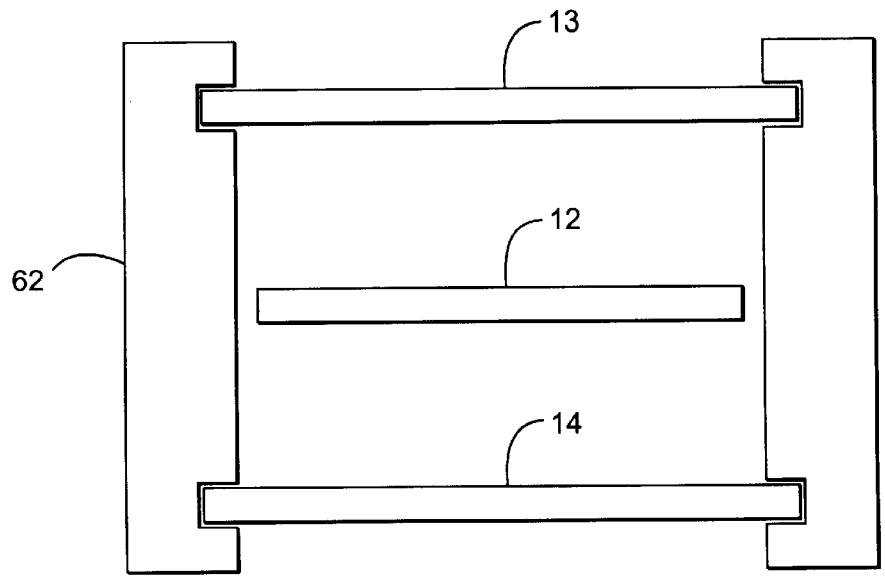
FIG. 8 is a end view taken along the line 8/8 of FIG. 7.

An actual practical example of the position sensor of the present invention for measuring the displacement of a voice coil actuator is illustrated in FIGS. 7 and 8, where FIG. 7 is a voice coil actuator 61 incorporating the position sensor and FIG. 8 shows the position sensor with its transmit section 13, slider or coupler section 12 and receiver section 14 incorporated in the actuator. The transmitter and receiver are, of course, affixed to the frame 62 of the voice coil actuator with coupler or slider 12 as best illustrated in FIG. 7 being connected only to coil holder 63, which moves in the direction as indicated by the arrow 64. It would be coupled to an actuated device such as the valve lifter of a diesel engine or some control device to control vehicle height. Movable coil holder 63 of actuator 61 includes a tubular coil 66 wrapped around it which interacts with the cylindrical ferromagnetic permanent magnet 67 through the air gap 68 in a manner well known in the art. The fixed outer frame 62 of the voice coil actuator is composed of soft iron for a flux return and is, of course, cylindrical in shape. The voice coil actuator may be used in conjunction with built in feedback control.

Referring now to FIGS. 9 in their various forms, as was discussed the diamond shape of the symmetrical pattern on the slider section 12 illustrated in FIG. 9A results in the linear pattern of FIG. 9B. If a second order characteristic is desired at either one end or the other end of movement of the slider 12, as illustrated in either FIGS. 9D and 9F, then the patterns of FIGS. 9C, and 9E, respectively, may be provided where in FIG. 9C the rate of change toward the maximum of the pattern is greater and in 9E the rate of change at the beginning of the pattern is greater.

Thus a linear position sensor has been provided.

What is claimed is:

1. A position sensor for sensing rectilinear movement of an object along an axis comprising:

a pair of spaced substantially rectilinear radio transmit and receive sections juxtaposed on said axis facing each other with a coupler section between them, said coupler being movable along said axis and connected to said object;

said receive section carrying a predetermined number of independent inductive coils segmentally arranged in a rectilinear pattern along said receive section;

said transmit section carrying coil means in a rectilinear pattern similar to said receive section and driven by a signal source at a predetermined radio frequency for inductive coupling to said coils of said receive section;

said coupler section carrying at least one symmetrical tapered conductive pattern for attenuating said inductive coupling, said pattern having linear positions of maximum and minimum attenuation with respect to any one of said plurality of inductive coils carried by said receive section, intermediate tapered positions of said pattern between said maximum and minimum providing substantially proportionate attenuations;

means connected to said coils carried by and receive section for demodulating and summing induced transmitted signals from said signal source for each linear position of said coupler, said summation producing a substantially sinusoidal waveform. whose phase shift varies in proportion to said linear movement of said coupler section;

and means for sensing phase shift.

2. A position sensor as in claim 1 where said means for sensing said phase shift includes pulse width modulation means the width of a pulse being proportional to the linear position of said coupler section.

3. A position sensor as in claim 1 where said conductive coupler pattern is non-linear between said maximum and minimum.

4. A position sensor as in claim 1 where the total coupler pattern is longer than the transmit pattern.

5. A position sensor as in claim 4 where a single symmetrical coupler pattern is equal to or shorter than said transmit pattern.

6. A position sensor as in claim 4 where the effective linear measurement distance of said coupler section is one less than the plurality of symmetrical coupler patterns.

\* \* \* \* \*